United States Patent [19]

Green et al.

[11] Patent Number: 5,445,191
[45] Date of Patent: Aug. 29, 1995

[54] HIGH PRESSURE BRAKE HOSE WITH REINFORCING LAYER OF NONWATER-BASED ADHESIVE COATED POLYVINYL ALCOHOL FIBERS

[75] Inventors: Randall L. Green; Robert A. Sauer; Gary P. Ford, all of Dayton, Ohio

[73] Assignee: General Motors Corporation, Detroit, Mich.

[21] Appl. No.: 288,857

[22] Filed: Aug. 11, 1994

[51] Int. Cl.⁶ ............................................. F16L 11/08
[52] U.S. Cl. ................................... 138/126; 138/124; 138/125; 138/137; 138/DIG. 1
[58] Field of Search ................ 138/123, 124, 125, 126, 138/137, DIG. 1

[56] References Cited

U.S. PATENT DOCUMENTS

| | | | |
|---|---|---|---|
| 781,353 | 1/1905 | Palmer | 138/125 |
| 2,754,848 | 7/1956 | Knowland et al. | 138/125 |
| 3,605,818 | 9/1971 | Balchan | 138/126 |
| 3,682,202 | 8/1972 | Buhrmann et al. | 158/126 |
| 3,750,712 | 8/1973 | Brand | 138/124 |
| 3,790,437 | 2/1974 | Haley et al. | 138/125 |
| 3,977,440 | 8/1976 | Phillippi | 138/125 |
| 4,091,843 | 5/1978 | Mikes et al. | 138/127 |
| 4,111,237 | 9/1978 | Mutzner et al. | 138/125 |
| 4,431,031 | 2/1984 | Ettlinger | 138/126 |
| 4,603,712 | 8/1986 | Krause | 138/137 |
| 4,734,305 | 3/1988 | Sugimoto et al. | 428/36 |
| 4,842,024 | 6/1989 | Palinchak | 138/125 |
| 5,021,509 | 6/1991 | Keller et al. | 138/DIG. 1 |

*Primary Examiner*—James E. Bryant, III
*Attorney, Agent, or Firm*—George A. Grove

[57] ABSTRACT

An hydraulic brake hose such as for automotive applications is formed of an EPDM elastomer core tube and one or more additional tube layers, each formed of such terpolymer compounded without processing oils and one or more interlying reinforcing layers of nonwater-base adhesive coated polyvinyl alcohol fibers. The absence of water from the reinforcing fibers provides thermal stability to the reinforcing layers, and the absence of compounding oil from the EPDM terpolymers also provides high temperature properties for the hose.

2 Claims, 1 Drawing Sheet

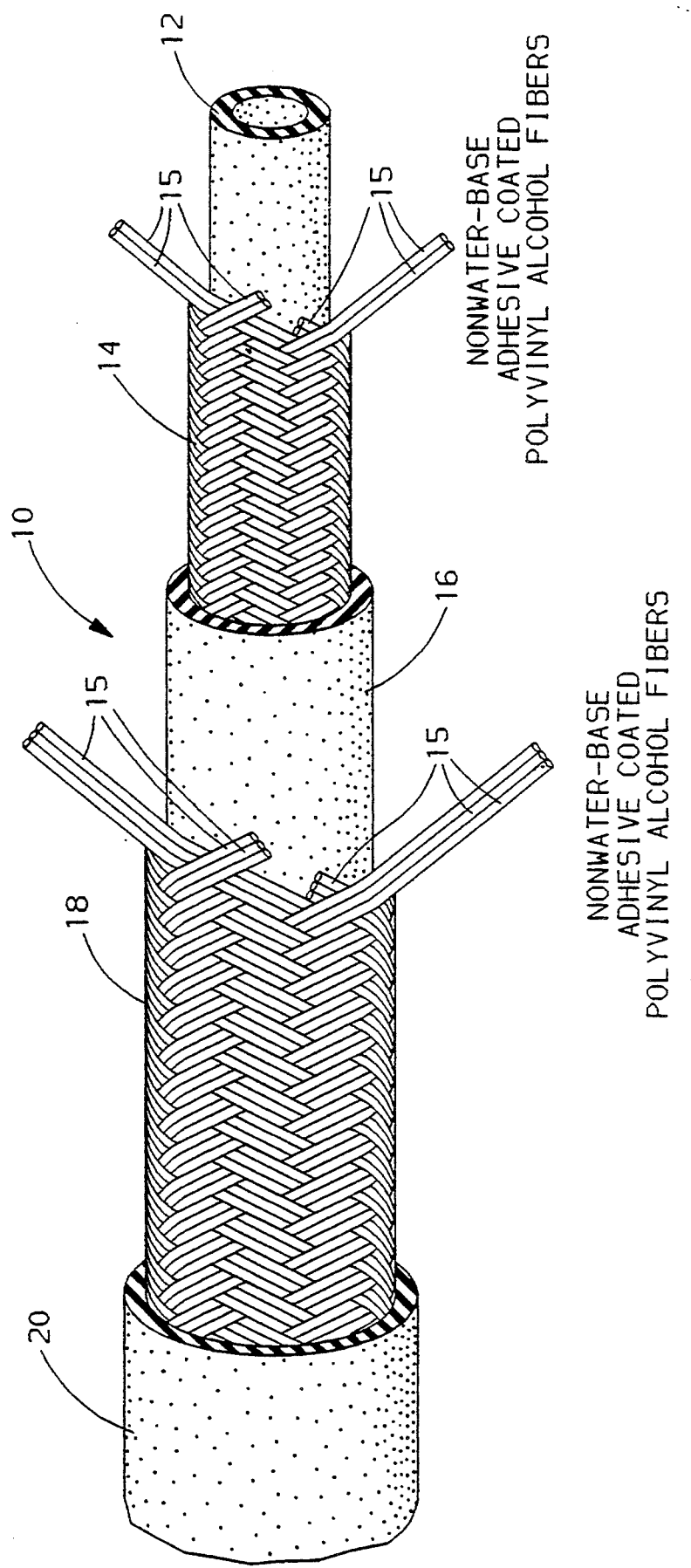

HIGH PRESSURE BRAKE HOSE WITH REINFORCING LAYER OF NONWATER-BASED ADHESIVE COATED POLYVINYL ALCOHOL FIBERS

This invention pertains to an improved high pressure rubber hose for use in automotive brake systems. More particularly, this invention pertains to a multi-layer elastomeric brake hose incorporating braided reinforcement layers and displaying improved properties particularly when exposed to high pressure impulses at relatively high temperatures.

BACKGROUND OF THE INVENTION

The operating requirements for high pressure hydraulic hose such as an automotive brake hose are ever increasing, and accordingly improvements in the materials and structure of the hose are required. Current automotive brake hose members now typically comprise five layers—three of suitable elastomeric composition and two of suitable wound or braided fiber reinforcing layers. For example, the brake hose includes an extruded elastomeric core tube member and having an internal diameter of nominally 3.3 millimeters and an outside diameter of about 5.1 millimeters. The core tube is formed of a suitable elastomeric composition that is compatible with a specified brake fluid. Wound or braided on the outside diameter of this core tube is a reinforcing layer of suitable fibrous material. A function of the fibrous reinforcement is to prevent excessive expansion of the core tube when the brake system is under high pressure. Such fibers have been made of rayon, glass or polyvinyl alcohol. Extruded over the first braided or wound reinforcing layer is a cushion layer of a suitable elastomeric material. The cushion layer has been suitably formed of materials such as natural rubber, styrene butadiene copolymer rubber, polychloroprene and ethylene-propylene-diene monomer rubber (EPDM rubber). Wound or braided over the cushion layer is another fiber yarn reinforcing layer. Suitable fibrous materials for this second layer have included nylon, rayon, glass fibers or polyvinyl alcohol. Finally, an outer elastomeric layer is provided as a protective layer to prevent the ingress of water, oils and other contaminants from the environment in which the hose is expected to operate. Cover layers have been suitably formed of polychloroprene, ethylene propylene diene rubber, chlorosulfonated polyethylene and the like. The overall outside diameter of such five layer hose is about 10.5 to 11 millimeters.

Typically, this five layer hose is cut to a suitable length. Metal fittings are attached at each end of the hose and crimped to form a secure connection. The hose may then be connected in the brake system of the vehicle, usually between a steel tube and a hydraulic fitting at the brake member for the vehicle wheel. The hose thus provides a flexible connection between the relatively rigid portions of the brake system and the wheel brake. It contains the brake fluid that, when placed under pressure by the operator of the vehicle, actuates the brake system at the wheels of the vehicle.

Such a brake hose must meet several exacting standards. As stated, the inner core of the hose must be chemically compatible with the brake fluid and not undergo excessive volumetric expansion when pressure is applied to the fluid. The hose must be flexible and resist fatigue, cracking or other failure over a very wide range of temperatures. In this regard, such brake hoses are subjected to pressure tests, volumetric expansion tests, whip tests and high temperature impulse tests which measure its performance and resistance to failure despite continual flexing, subjection to high pressure impulses and exposure to high and low temperatures. The composite hose structure must prevent egress of the brake fluid and ingress of water to the brake fluid, which can adversely affect its properties, and the ingress of oil and other contaminants found in the vicinity of an operating brake hose.

While generally suitable hydraulic brake hose constructions have consisted of the use of EPDM elastomers incorporating carbon black and processing oils as each of the core layer, cushion layer and cover layer of the hose and polyvinyl alcohol fibers have been successfully used as the reinforcing materials in the two braid layers, it is desired to further improve the properties of these hoses, particularly against failure at repeated high pressure impulses from the brake fluid. EPDM rubber elastomers have found widespread application in brake hose because they seem to be impervious to water and prevent water from diluting and lowering the boiling point of the brake fluid. Similarly, braided polyvinyl alcohol fibers, especially when coated with a resorcinol-formaldehyde latex adhesive, have found to interact with and cooperate with the core tube, cushion and cover layers of EPDM elastomers to strengthen the hose construction against excessive volumetric expansion. However, while this combination of materials has otherwise provided excellent brake hose properties, it is weaker than other hose material constructions with respect to high temperature impulse tests.

Accordingly, it is an object of the subject invention to provide an improved high pressure brake hose structure employing EPDM elastomers for the respective elastomeric layers of the hose and polyvinyl alcohol fibers as the reinforcing layers of the hose. It is another object of the invention to provide such improvements in high temperature impulse characteristics of the hose without sacrificing other essential characteristics of the hose.

SUMMARY OF THE INVENTION

In accordance with a preferred embodiment of our invention, these and other objects and advantages are accomplished as follows.

A brake hose is made by first extruding a layer of a processing oil-free ethylene-propylene-diene monomer elastomer over a mandrel of suitable diameter. The nominal internal diameter of this core robe is about one-eighth of an inch or 3.5 millimeters. A reinforcing wrap of adhesive-coated polyvinyl alcohol fiber yarn is then braided tightly over the extruded robe of EPDM elastomer. Preferably, the braid angle of this polyvinyl alcohol wrap with respect to the longitudinal axis of the hose is nominally 54 degrees (for example, 53.5 degrees to 56.5 degrees). An elastomeric cushion layer of EPDM terpolymer elastomer, preferably compounded without process or viscosity modifying oils, is extruded over the first braided reinforcing layer. A second reinforcing layer of polyvinyl alcohol fibers coated with a suitable adhesive is then braided over the cushion layer suitably at a nominal braid angle of 56 degrees (for example, 54.3 to 57.5 degrees). Finally, a cover layer of uncured EPDM elastomer without processing oils is extruded over the second braid layer. This five-layer construction plus mandrel is then heated with high pressure steam until the several rubber layers are cured and the adhesive on the two fiber wraps is activated and bonds the fibers to each other and to the adjoining EPDM elastomer layers.

The mandrel is then forced out of the hose, the hose is cut into suitable lengths and end fittings are attached for assembly on a motor vehicle.

For many years in automotive brake hose manufacture, it has been the practice to provide a resorcinol-formaldehyde latex adhesive coating layer to whatever fiber material is used in the reinforcing layers of the hose. Of course, the resorcinol-formaldehyde latex contains water. It is applied to the reinforcing fiber and dried to a thin, almost imperceptible film. After the adhesive-coated fiber is braided or wrapped in the desired hose construction, the adhesive is thermally activated, usually when the elastomer layers are cured, to strengthen the braid and bond it to the adjacent elastomer layers. Such R-F latex adhesive has long proven to be an inexpensive and preferred adhesive for automotive brake hose structures. One aspect of our invention is based on our discovery that the small residual water content of these latex-based adhesives adversely affects polyvinyl alcohol fibers during high temperature operations of the brake hose. Accordingly, we have found that by employing adhesives that are essentially water-free based adhesives markedly improve the performance of a brake hose utilizing polyvinyl alcohol fibers in combination with EPDM elastomers. We have further found that by employing EPDM elastomers for at least the tube and cover layers that are essentially free of processing oil and viscosity modifier compounding oils, the composite hose structure of our invention displays markedly improved physical properties, especially improved resistance to high pressure impulses at high temperatures.

These and other objects of our invention will become more apparent from a detailed description thereof which follows. In the description, reference will be had to the drawings in which:

BRIEF DESCRIPTION OF THE DRAWING

The drawing FIGURE illustrates in an enlarged view a portion of our five-layer brake hose structure partly broken away and in section to show the several layers that make up the construction.

DESCRIPTION OF THE PREFERRED EMBODIMENT

The drawing shows a typical brake hose construction 10 in accordance with our invention.

Our hose includes an elastomeric core tube or inner tube 12. Following is a composition in parts per weight of an uncured ethylene-propylene-diene monomer composition suitable for use in extruding core tube 12.

| MATERIAL | PARTS |
| --- | --- |
| EPDM Polymers - Mooney Viscosity about 25-45 | 100.00 |
| Liquid EPDM Polymer | 38.80 |
| Carbon Blacks (ASTM N774, N550, N330) | 100.00 |
| Stearic Acid | 1.00 |
| Polyethylene | 1.00 |
| Zinc Oxide | 7.00 |
| Sulfur | 2.00 |
| Tetramethyl thiuram disulfide | 2.50 |
| 4,4' dithiodimorpholine | 1.00 |
| | 253.30 |

It is noted that this composition comprises an uncured solid EPDM polymer of relatively low viscosity and a low molecular weight EPDM polymer that is liquid. However, the composition contains no processing oil. Of course, the carbon blacks are reinforcing materials, and the zinc oxide, sulfur and sulfur-containing compounds are curing agents and curing accelerators. This composition is suitably prepared or compounded on a rubber mill and then transferred to an extrusion machine and extruded about a core mandrel (not shown in the FIGURE) to form a core layer having a nominal diameter of three to three and one-half millimeters and an outer diameter of about five to five and one-half millimeters.

A first reinforcing braid layer is formed on the uncured EPDM core tube 12 while the tube is still on the forming mandrel. The braid layer is shown at 14 in the drawing FIGURE. It is formed using a polyvinyl alcohol fiber yarn. Each fiber yarn end (or strand) is coated with a nonwater-based adhesive based on a styrene bearing polyisocyanate composition. An example of a suitable adhesive is Esterweld EP (The Bibb Company, Porterdale, Ga.). However, the critical feature is that the adhesive be anhydrous. The nonwater-based adhesive coated yarn ends 15 are braided in a 24 carrier/two end configuration at an angle of 53.5 degrees to 56.5 degrees with respect to the longitudinal axis of the tube. A critical feature of this layer is that the fibers are coated with an adhesive that is curable at about the same temperature that the EPDM elastomer compound is cured and that the adhesive contains essentially no water.

After the first braid layer 14 has been formed, a cushion layer 16 of the following EPDM compound is extruded over the braid layer.

| MATERIAL | PARTS |
| --- | --- |
| EPDM Polymers - Mooney Viscosity about 65-75 | 100.00 |
| Liquid EPDM Polymer | 38.80 |
| Carbon Blacks (ASTM N774, N550, N330) | 100.00 |
| Stearic Acid | 1.00 |
| Polyethylene (AC617A) | 1.00 |
| Zinc Oxide | 7.00 |
| Sulfur | 2.00 |
| Tetramethyl thiuram disulfide | 2.75 |
| 4,4' dithiodimorpholine | 1.00 |
| | 253.55 |

Again, this cushion liner EPDM-based material contains no processing oil. The nominal outer diameter of the cushion layer is about eight and three-quarters millimeters.

A second braided reinforcing layer 18 is then wound over cushion layer 16. The second braid layer may be formed of the same polyvinyl alcohol composition filaments as first braid layer 14. The fibers are coated with a nonwater-based adhesive suitably of the same composition as that employed in the first braid layer. Suitably, the yarn is braided in a 24 carrier/three end configuration at an angle of 54.3 degrees to 57.5 degrees with respect to the axis of the hose.

Finally, an EPDM elastomer outer cover compound is extruded over the second braid layer to form an outer cover 20. The composition of the uncured EPDM outer cover compound in parts per weight is as follows.

| MATERIAL | PARTS |
| --- | --- |
| EPDM Polymers - Mooney Viscosity 35-45 | 100.00 |
| Liquid EPDM Polymer | 44.40 |
| Carbon Blacks (ASTM N774, N550, N330) | 70.00 |
| Silica (HiSil) | 45.00 |
| Stearic Acid | 4.00 |
| Polyethylene | 1.00 |
| Resorcinol (60%) | 5.00 |
| Hexamethylene tetramine (62.5%) | 5.00 |
| Zinc Oxide | 10.00 |
| Sulfur | 0.50 |
| a,a'-bis (t-butylperoxy) diisopropyl benzene | 10.80 |
| | 295.70 |

After the cover layer has been extruded, the overall structure is cured and the mandrel and hose structure is passed through a steam autoclave at a temperature of 350° F. for about 30 minutes. This practice cures the three EPDM polymer compound layers and activates the nonwater-base adhesive on the braid layers, better anchoring each of the braid layers and bonding them to adjoining EPDM elastomer layers. The overall thickness of the five layer hose construction is suitably ten to eleven millimeters.

Our hose construction 10 has been extensively tested. Included in the tests are tests with United States Government Department of Transportation specified DOT 3 (ethylene glycol ether) brake fluids and DOT 4 (borate ester) brake fluids. Both the DOT 3 and DOT 4 brake fluids are high boiling synthetic liquids that have been specified as suitable for automotive passenger car and truck applications. A significant function of the brake hose is that it be chemically compatible with these fluids and that it prevent outside water from contaminating the nonaqueous brake fluid. Water dilutes the fluid and lowers the boiling point, which reduces its performance in braking applications.

The combination of the polyvinyl alcohol fiber braid layers and the EPDM elastomer layers provides a high quality brake hose. The hose demonstrates very low volumetric expansion (ASTM D571) when subjected to the pressure of the brake fluids. For example, a volumetric expansion of no more than 0.15 cc/ft at 1000 psi and 0.20 cc/ft at 1500 psi fluid pressure is observed. Our EPDM/nonaqueous polyvinyl alcohol hose structures also display very long whip lives of 360 to 600 hours when subjected to the whip test. This test is also carried out in accordance with ASTM procedure D571. A number of sections of hose equipped with fittings are gripped at the ends and whipped about like a jump rope until they rupture. This is a measure of the hose's ability to function under the dynamic conditions encountered by a motor vehicle.

Our hose construction particularly provides improved results compared to previous EPDM polyvinyl alcohol fiber hoses in the hot impulse test. In this test, four hose sections are connected in series and subjected to pressure impulses with a brake fluid heated at a temperature of 290° F. In this test, the pressure is applied to the fluid and the hose at a level of 1600 to 1650 psi gauge for one minute. The pressure is then released to substantially ambient pressure for one minute and the cycle repeated. The test is intended to see how many such cycles at 290° F. with DOT 3 or DOT 4 brake fluid the hose can withstand. Our hoses typically withstand 16,000 to 18,000 such hot impulse cycles with a DOT 3 fluid and from 7,000 to 11,000 cycles with DOT 4 fluids.

When a like hose construction is made using the prior art polyvinyl alcohol yarns coated with a water-base adhesive such as the resorcinol formaldehyde latex adhesives, the hoses failed at between 3600 cycles and 5800 cycles with the DOT 4 fluid. This dramatic improvement in hot impulse test result is attributed to the elimination of the small amount of water that is retained in the polyvinyl alcohol yarn even after drying the water-base adhesives employed in the prior art. While the adhesive was dried on such prior art yarns, there is apparently still sufficient water trapped in the yarn that at the temperature of the hot impulse test, the residual water degrades the polyvinyl alcohol braid so that the repeated impulses of the test cause the failure of the hose in this test mode.

Our hose is further improved in the use of EPDM compounds that contain no process or viscosity modifying oils. We view this practice as highly preferred for the tube and cover layers of the hose. Although not preferred, some deviation can be tolerated in the cushion layer. We have found that this oil-free departure from prior art compounding techniques for EPDM provides significantly better heat resistance due to the absence of such fugitive oils. The hose also displays better interlayer adhesion due to the absence of the interfering effects of such oils and oil-like materials. Furthermore, we find that our hoses provide better sealability with their fittings when the hose's construction is employed on the vehicle because our compounds swell slightly upon contact with the brake fluid rather than shrinking, as is common for the EPDM elastomers which are compounded with oils.

Accordingly, our invention makes use of improved EPDM compounds and improved adhesives for the polyvinyl alcohol filaments used in our reinforcing braid layers. The combination of these benefits has produced a more durable brake hose.

While our invention has been described in terms of a specific embodiment thereof, it will be appreciated that other embodiments could readily be adapted by those skilled in the art. Accordingly, the scope of our invention is to be considered limited only by the following claims.

The invention claimed is:

1. A hydraulic brake hose comprising:
   an elastomeric core tube consisting essentially of extruded and cured ethylene-propylene-diene monomer elastomer compounded without oil;
   a first reinforcing braid layer of nonwater-base adhesive coated polyvinyl alcohol fibers overlying said core tube;
   an elastomeric cushion layer overlying said first braided reinforcing layer and consisting essentially of cured ethylene-propylene-diene monomer elastomer;
   a second reinforcing braid layer of nonwater-base adhesive coated polyvinyl alcohol fibers overlying said cushion layer; and
   an elastomeric cover layer overlying said second braid layer and consisting essentially of cured ethylene-propylene-diene monomer elastomer compounded without oil.

2. A hydraulic brake hose comprising:
   an elastomeric core tube consisting essentially of extruded and cured ethylene-propylene-diene monomer elastomer compounded without oil;

a first reinforcing braid layer of nonwater-base adhesive coated polyvinyl alcohol fibers overlying said core tube;

an elastomeric cushion layer overlying said first braided reinforcing layer and consisting essentially of cured ethylene-propylene-diene monomer elastomer compounded without oil;

a second reinforcing braid layer of nonwater-base adhesive coated polyvinyl alcohol fibers overlying said cushion layer; and an elastomeric cover layer overlying said second braid layer and consisting essentially of cured ethylene-propylene-diene monomer elastomer compounded without oil.

* * * * *